United States Patent
Butterfield et al.

(10) Patent No.: US 12,437,532 B2
(45) Date of Patent: Oct. 7, 2025

(54) INTELLIGENT MULTI-VISUAL CAMERA SYSTEM AND METHOD

(71) Applicant: TerraClear Inc., Bellevue, WA (US)

(72) Inventors: Isabelle Butterfield, Bellevue, WA (US); Paul Barsic, Seattle, WA (US); Alex Terekhov, Bellevue, WA (US)

(73) Assignee: TerraClear Inc., Bellevue, WA (US)

( * ) Notice: Subject to any disclaimer, the term of this patent is extended or adjusted under 35 U.S.C. 154(b) by 407 days.

(21) Appl. No.: 17/372,285

(22) Filed: Jul. 9, 2021

(65) Prior Publication Data
US 2022/0012494 A1    Jan. 13, 2022

Related U.S. Application Data

(60) Provisional application No. 63/050,672, filed on Jul. 10, 2020.

(51) Int. Cl.
*G06V 20/10* (2022.01)
*G06T 7/246* (2017.01)
(Continued)

(52) U.S. Cl.
CPC .............. *G06V 20/10* (2022.01); *G06T 7/246* (2017.01); *G06T 7/292* (2017.01); *G06T 7/73* (2017.01);
(Continued)

(58) Field of Classification Search
None
See application file for complete search history.

(56) References Cited

U.S. PATENT DOCUMENTS

| | | |
|---|---|---|
| 2015/0054913 A1 | 2/2015 | Annau et al. |
| 2018/0103213 A1 | 4/2018 | Holzer et al. |
| 2018/0158197 A1* | 6/2018 | Dasgupta ............. H04N 13/282 |

FOREIGN PATENT DOCUMENTS

JP    2009026250 A  *  2/2009

OTHER PUBLICATIONS

Li, Peiliang, and Tong Qin. "Stereo vision-based semantic 3d object and ego-motion tracking for autonomous driving." Proceedings of the European Conference on Computer Vision (ECCV). 2018. (Year: 2018).*

(Continued)

*Primary Examiner* — Vincent Rudolph
*Assistant Examiner* — Meredith Taylor
(74) *Attorney, Agent, or Firm* — Seed Intellectual Property Law Group LLP

(57) ABSTRACT

An intelligent multi-visual camera system is disclosed that includes a multiple visual sensor array and a control system. The multiple visual sensor array includes multiple visual cameras spaced apart from each other. The control system also receives input from the multiple visual cameras, stores instructions that cause the processor to: initiate a registration system that projects images from the multiple visual cameras into a single three-dimensional volume and coordinate overlapping pixels of adjacent images amongst each other; detect one or more features of interest in the images from the multiple visual cameras; track one or more features of interest in one frame in one image from the multiple visual cameras into a subsequent frame in a subsequent image from the multiple visual cameras; deduplicate the projected images from the multiple visual cameras onto the ground plane; and communicate information regarding the features of interest that have been detected.

48 Claims, 13 Drawing Sheets

(51) Int. Cl.
   G06T 7/292      (2017.01)
   G06T 7/73       (2017.01)
   G06V 20/58      (2022.01)
   H04N 13/388     (2018.01)
   H04N 23/90      (2023.01)

(52) U.S. Cl.
   CPC ........... G06V 20/58 (2022.01); H04N 13/388 (2018.05); H04N 23/90 (2023.01); *G06T 2207/10016* (2013.01); *G06T 2207/20084* (2013.01)

(56) References Cited

OTHER PUBLICATIONS

Ramirez, Alfredo, Eshed Ohn-Bar, and Mohan Trivedi. "Panoramic stitching for driver assistance and applications to motion saliency-based risk analysis." 16th International IEEE Conference on Intelligent Transportation Systems (ITSC 2013). IEEE, 2013. (Year: 2013).*

E. Grosso and M. Tistarelli, "Active/dynamic stereo: a general framework," Proceedings of IEEE Conference on Computer Vision and Pattern Recognition, New York, NY, USA, 1993, pp. 732-734, doi: 10.1109/CVPR.1993.341147. (Year: 1993).*

Jahn, Herbert. "Parallel epipolar stereo matching." Proceedings 15th International Conference on Pattern Recognition. ICPR-2000. vol. 1. IEEE, 2000. (Year: 2000).*

Kise et al., "A Stereovision-based Crop Row Detection Method for Tractor-automated Guidance," *Biosystems Engineering* 90(4):357-367, 2005.

Leibe et al., "Coupled Object Detection and Tracking from Static Cameras and Moving Vehicles," *IEEE Transactions on Pattern Analysis and Machine Intelligence* 30(10):1683-1698, Oct. 2008.

Morat et al., "Tracking with Stereo-vision System for Low Speed Following Applications," *IEEE Intelligent Vehicles Symposium*, IEEE, Istanbul, Turkey, pp. 955-961, Jun. 2007.

\* cited by examiner

INTELLIGENT MULTI-VISUAL CAMERA SYSTEM AND METHOD

TECHNICAL FIELD

The present disclosure relates generally to a system and method for sensing, detecting, and communicating information about objects or instructions in robotics operations.

BACKGROUND

Description of the Related Art

In industrial and agricultural operations, there are often tasks that involve one or more pieces of equipment or machinery acting within an uncontrolled environment. Three main methods that are implemented to control these systems are operator-based control, semi-autonomous control, and autonomous control. The execution of tasks through these control mechanisms becomes more efficient when information about the environment is leveraged. For example, a combine is best operated using the knowledge of unharvested crop location, field boundary location, and obstacle location. In the environment of operator-controlled equipment, it may be difficult for an operator to efficiently gather all relevant information about the environment during operation. For example, while an operator is controlling a combine to target an unharvested crop, it is difficult for them to identify obstacles approaching relative to the machine's motion. Colliding with a large rock often breaks or otherwise damages pieces of the equipment that then need to be replaced, resulting in costly repairs and lost time.

Referring to operator-based control, it is difficult for an operator to efficiently gather data of the subjects on which the machinery is acting, while at the same time controlling their machinery. This exposes an area for improvement concerning data collection and, therefore, this data collection offers benefits toward process improvements. For example, a forklift operator might benefit from knowing statistics on the different box sizes they move within a day to aid in better planned organization of those boxes at their destination. Improved methods for obtaining, processing, and implementing this type of information for operator-based control are needed.

Referring to autonomous and semi-autonomous machinery and control, the systems require information about the operating environment as well as information on their target subjects. Once again, improved methods for obtaining, processing, and implementing this type of information for autonomous and semi-autonomous system control are needed.

The current systems for informing equipment operation that are implemented include options such as single-camera vision information, non-vision-based sensor information (e.g., ultrasonic sensing or laser range-finding), or operator knowledge. All of these prior systems are lacking in one or more aspects. There is a continuing need in the art regarding these and other current technological shortcomings.

BRIEF SUMMARY

There are several technological improvements provided by the disclosed intelligent multi-visual camera system and method over prior single-camera vision information. First, with the multiple visual cameras of the intelligent multi-visual camera system, the system receives visual sensory information over a larger region without loss in image quality. Image quality is important when using vision sensors to detect objects. Accordingly, the ability to sense over a large region without compromising on image quality is a significant technological improvement. Additionally, the redundancy that is offered by multiple visual cameras sharing a view of some shared regions ensures a higher chance of identifying all objects of interest in the regions.

Further technological improvements provided by the disclosed intelligent multi-visual camera system and method over non-vision sensor information include information richness. While other sensing techniques, such as ultrasonic, may be used to acquire measurements and aid in understanding equipment position relative to other masses, such techniques do not provide information that may be used to distinguish whether these masses are obstacles, targets, target-occluding objects, or some other neutral piece of the environment. Thus, the intelligent multi-visual camera system and method offers the technological improvements of providing both visual information to an operator as well as interpretation of this visual information itself In this manner, the intelligent multi-visual camera system and method enables meaning to be derived from the objects (e.g., obstacles, targets, target-occluding objects, or some other neutral piece of the environment) identified in the environment by the system.

Moreover, the intelligent multi-visual camera system and method provides a technological improvement over operator knowledge with respect to efficiency. In this regard, the computer-based sensing of the intelligent multi-visual camera system and method over a dynamic environment is able to process and react to objects of interest more effectively than a multitasking operator. For example, while a combine operator is adjusting speed, targeting a crop, and turning the combine towards that crop, the operator may not notice a dangerous rock or other obstacle outside of his field of view, while the intelligent multi-visual camera system and method would not have its efficiency reduced by such multitasking issues.

Accordingly, the intelligent multi-visual camera system and method provides technological improvements in many areas, including by way of example only, and not by way of limitation: interchangeable sensing configurations, multi-sensor input, real-time feedback, occlusion handling, and management of interchangeable environments. Additionally, the intelligent multi-visual camera system and method may also be used in combination with other modes of sensing, such as multispectral imaging, LiDAR, Radar, and the like.

Some embodiments of an intelligent multi-visual camera method may be summarized as including: providing a multiple visual sensor array including multiple visual cameras spaced apart from each other, wherein each of the multiple visual cameras is mounted on a support frame, wherein each camera acquires its own independent image; initiating a registration system that projects images from the multiple visual cameras into a single three-dimensional volume; detecting features of interest in the images from the multiple visual cameras using a neural network, wherein detection of features of interest includes classification, pixel location in the image, and boundary representation in the image; identifying a feature of interest in one frame in an image from the multiple visual cameras, and identifying the same feature of interest in a subsequent frame in an image from the multiple visual cameras, which provides improved computational speed and persistent feature association over sequential images; projecting the features of interest from the multiple visual cameras into the three-dimensional volume to identify instances where the same objects have been identified by multiple cameras and ensure unique features of interest; predicting a presence of an object in absence of object detection by logging positions of objects over time; employing a logging system that uses a feedback loop to assess quality of collected data; and displaying collected imagery as a single synthesized view of camera feed overlap from the multiple visual cameras with overlaying boxes on the displayed collected imagery identifying objects of interest.

In another aspect of the intelligent multi-visual camera method, a number, type, and position of the multi-visual cameras are configurable, enabling sensing over differently sized regions, at various resolution requirements, and in a variety of mediums.

In still another aspect of some embodiments, the multiple cameras of the multi-visual camera system receive visual sensory information over a larger region than a single camera without loss in image quality. In yet another aspect of some embodiments, initiating the registration operation further includes one or more of: detecting shared common points in one frame from each camera with data associated with shared common point locations within the three-dimensional volume; using the shared common point locations to characterize the geometry that transforms the images to an epipolar representation; and providing mapping features in one image from the multiple visual cameras to equivalent features in other images from other cameras of the multiple visual cameras that overlap the same search volume.

In some embodiments of the intelligent multi-visual camera method, the neural network is configurable for use in any environment, with any number of desired object classes. In another aspect of some embodiments, the computational speed improvement is achieved by the intelligent multi-visual camera method since tracking operations are less computationally demanding than detection operations. Accordingly, a detection operation is intermittently replaced with a tracking operation, following the location of a previously detected feature rather than redundantly detecting the feature location out of a full environment on each iteration. In still another aspect of some embodiments, the tracking operation simultaneously enables confirmation of distinguishing two features in sequential images or associating two features in sequential images. In yet another aspect of some embodiments, the deduplicating operation further includes: determining sets of identified objects from each image which have been highlighted in the detecting and the tracking of those images, and producing a single set of all objects identified in a total sensed search volume by removing the duplicate objects in the image.

In one or more embodiments of the intelligent multi-visual camera method, the predictive ego-tracking provides an estimation of platform motion through the three-dimensional volume and can provide an estimated time to reach a location within that volume. In some embodiments, the logging system uses artificial intelligence to provide continuous performance improvement. In another aspect of some embodiments, when used in an autonomous or semi-autonomous system, instructions based on known environmental information determined by the intelligent multi-visual camera method are communicated to actuator controls, operational control software, or both. In still another aspect of some embodiments, the intelligent multi-visual camera system further comprises one or more of visual, infra-red multispectral imaging, LiDAR, or Radar.

Some embodiments of an intelligent multi-visual camera method for assisting robotics by sensing, detecting, and communicating information about detected objects may be summarized as including: providing a multiple visual sensor array including multiple visual cameras spaced apart from each other, wherein each of the multiple visual cameras is mounted on a support frame, and wherein each camera acquires its own independent image; initiating a registration system that projects images from the multiple visual cameras into a single three-dimensional volume; detecting one or more features of interest in the images from the multiple visual cameras, wherein detection of features of interest include classification, pixel location in the image, and boundary representation in the image; tracking one or more features of interest in one frame in an image from the multiple visual cameras, and identifying the same feature of interest in a subsequent frame in an image from the multiple visual cameras; projecting the features of interest from the multiple visual cameras into the three-dimensional volume to identify instances where the same objects have been identified by multiple cameras and ensure unique features of interest; and communicating information regarding the one or more features of interest that have been detected.

In some embodiments of the intelligent multi-visual camera method, the communicating of information regarding the features of interest that have been detected further includes: displaying collected imagery as a single synthesized view of camera feed overlap from the multiple visual cameras with overlaying boxes on the displayed collected imagery identifying objects of interest. In other embodiments of the intelligent multi-visual camera method, the communicating of information regarding the features of interest that have been detected comprises sending instructions based on the projected images from the multiple visual cameras to one or more of actuator controls and operational control software.

In another aspect of the intelligent multi-visual camera method, a number, type, and position of the multi-visual cameras are configurable, enabling sensing over differently sized regions, at various resolution requirements, and in a variety of mediums. In still another aspect of some embodiments, the multiple cameras of the multi-visual camera system receive visual sensory information over a larger region than a single camera without loss in image quality. In yet another aspect of some embodiments, initiating the registration operation further includes one or more of: detecting shared common points in one frame from each camera with data associated with shared common point locations within the three-dimensional volume; using the shared common point locations to characterize the geometry that transforms the images to an epipolar representation; and providing mapping features in one image from the multiple visual cameras to equivalent features in other images from other cameras of the multiple visual cameras that overlap the same search volume.

In some embodiments of the intelligent multi-visual camera method, the neural network is configurable for use in any environment, with any number of desired object classes. In another aspect of some embodiments, the computational speed improvement is achieved by the intelligent multi-visual camera method since tracking operations are less computationally demanding than detection operations. Accordingly, a detection operation is intermittently replaced with a tracking operation, following the location of a previously detected feature rather than redundantly detecting the feature location out of a full environment on each iteration. In still another aspect of some embodiments, the tracking operation simultaneously enables confirmation of distinguishing two features in sequential images or associating two features in sequential images. In yet another aspect of some embodiments, the deduplicating operation further includes: determining sets of identified objects from each image which have been highlighted in the detecting and the tracking of those images, and producing a single set of all objects identified in a total sensed search volume by removing the duplicate objects in the image.

In one or more embodiments of the intelligent multi-visual camera method, the predictive ego-tracking provides an estimation of platform motion through the three-dimensional volume and can provide an estimated time to reach a location within that volume. In some embodiments, the logging system uses artificial intelligence to provide continuous performance improvement. In another aspect of some embodiments, when used in an autonomous or semi-autonomous system, instructions based on known environmental information determined by the intelligent multi-visual camera method are communicated to actuator controls, operational control software, or both. In still another aspect of some embodiments, the intelligent multi-visual camera system further comprises one or more of multispectral imaging, LiDAR, or Radar.

Some embodiments of an intelligent multi-camera system may be summarized as including: a multiple sensor array including multiple cameras spaced apart from each other, wherein each of the multiple cameras is mounted on a support frame, and wherein each camera acquires its own independent image; and a control system that receives input from the multiple cameras, the control system including a processor and a memory storing computer instructions that, when executed by the processor, cause the processor to: initiate a registration system that projects images from the multiple cameras into a single three-dimensional volume; detect one or more features of interest in the images from the multiple cameras, wherein detection of features of interest include classification, pixel location in the image, and boundary representation in the image; track one or more features of interest in one frame in an image from the multiple cameras, and identify the same one or more features of interest in a subsequent frame in an image from the multiple cameras; project the features of interest from the multiple cameras into the three-dimensional volume to identify instances where the same objects have been identified by multiple cameras and ensure unique features of interest; and communicate information regarding the features of interest that have been detected.

In some embodiments of the intelligent multi-camera system, the communicating of information regarding the features of interest that have been detected, further includes: displaying collected imagery as a single synthesized view of camera feed overlap from the multiple cameras with overlaying boxes on the displayed collected imagery identifying objects of interest. In other embodiments of the intelligent multi-camera system, the communicating of information regarding the features of interest that have been detected comprises sending instructions based on the projected images from the multiple cameras to one or more of actuator controls and operational control software.

In another aspect of the intelligent multi-camera system, a number, type, and position of the multi-cameras are configurable, enabling sensing over differently sized regions, at various resolution requirements, and in a variety of mediums. In still another aspect of some embodiments, the multiple cameras of the multi-camera system receive sensory information over a larger region than a single camera without loss in image quality. In yet another aspect of some embodiments, initiating the registration operation further includes one or more of: detecting shared common points in one frame from each camera with data associated with shared common point locations within the three-dimensional volume; using the shared common point locations to characterize the geometry that transforms the images to an epipolar representation; and providing mapping features in one image from the multiple cameras to equivalent features in other images from other cameras of the multiple cameras that overlap the same search volume.

In some embodiments of the intelligent multi-camera system, the neural network is configurable for use in any environment, with any number of desired object classes. In another aspect of some embodiments, the computational speed improvement is achieved by the intelligent multi-camera system since tracking operations are less computationally demanding than detection operations. Accordingly, a detection operation is intermittently replaced with a tracking operation, following the location of a previously detected feature rather than redundantly detecting the feature location out of a full environment on each iteration. In still another aspect of some embodiments, the tracking operation simultaneously enables confirmation of distinguishing two features in sequential images or associating two features in sequential images. In yet another aspect of some embodiments, the deduplicating operation further includes: determining sets of identified objects from each image which have been highlighted in the detecting and the tracking of those images, and producing a single set of all objects identified in a total sensed search volume by removing the duplicate objects in the image.

In one or more embodiments of the intelligent multi-camera system, the predictive ego-tracking provides an estimation of platform motion through the three-dimensional volume and can provide an estimated time to reach a location within that volume. In some embodiments, the logging system uses artificial intelligence to provide continuous performance improvement. In another aspect of some embodiments, when used in an autonomous or semi-autonomous system, instructions based on known environmental information determined by the intelligent multi-camera system are communicated to actuator controls, operational control software, or both. In still another aspect of some embodiments, the intelligent multi-camera system further comprises one or more of multispectral imaging, LiDAR, or Radar.

Some embodiments of an intelligent multi-camera method for detecting and communicating information about detected objects may be summarized as including: projecting the features of interest from the multiple cameras into the three-dimensional volume; detecting shared common points in one frame from each camera with data associated with shared common point locations within the three-dimensional volume; using the shared common point locations to characterize the geometry that transforms the images to an epipolar representation; calculating row-dependent shifts parallel to the epipolar lines; providing mapping features in one image from the multiple cameras to equivalent features in other images from other cameras of the multiple cameras that overlap the same search volume; limiting a three dimension volume around a ground plane; and increasing computational speed and accuracy of the stereo disparity calculation by limiting feature search volume.

Some embodiments of an intelligent multicamera system may be summarized as including: a multiple sensor array including multiple cameras spaced apart from each other, wherein each of the multiple cameras is mounted on a support frame, wherein each camera acquires its own independent image; and a control system that receives input from the multiple cameras, the control system including a processor and a memory storing computer instructions that, when executed by the processor, cause the processor to: project the features of interest from the multiple cameras into the three-dimensional volume; detect shared common points in one frame from each camera with data associated with shared common point locations within the three-dimensional volume; use the shared common point locations to characterize the geometry that transforms the images to an epipolar representation; calculate row-dependent shifts parallel to the epipolar lines; provide mapping features in one image from the multiple cameras to equivalent features in other images from other cameras of the multiple cameras that overlap the same search volume; limit a three dimension volume around a ground plane; and increase computational speed and accuracy of the stereo disparity calculation by limiting feature search volume.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

In the description below, the x-direction is across the direction of motion of the ground vehicle (i.e., lateral motion), the y-direction the direction of forward motion of the vehicle and the z-direction the upwards normal from the ground plane (i.e., vertical motion).

Figure 1:
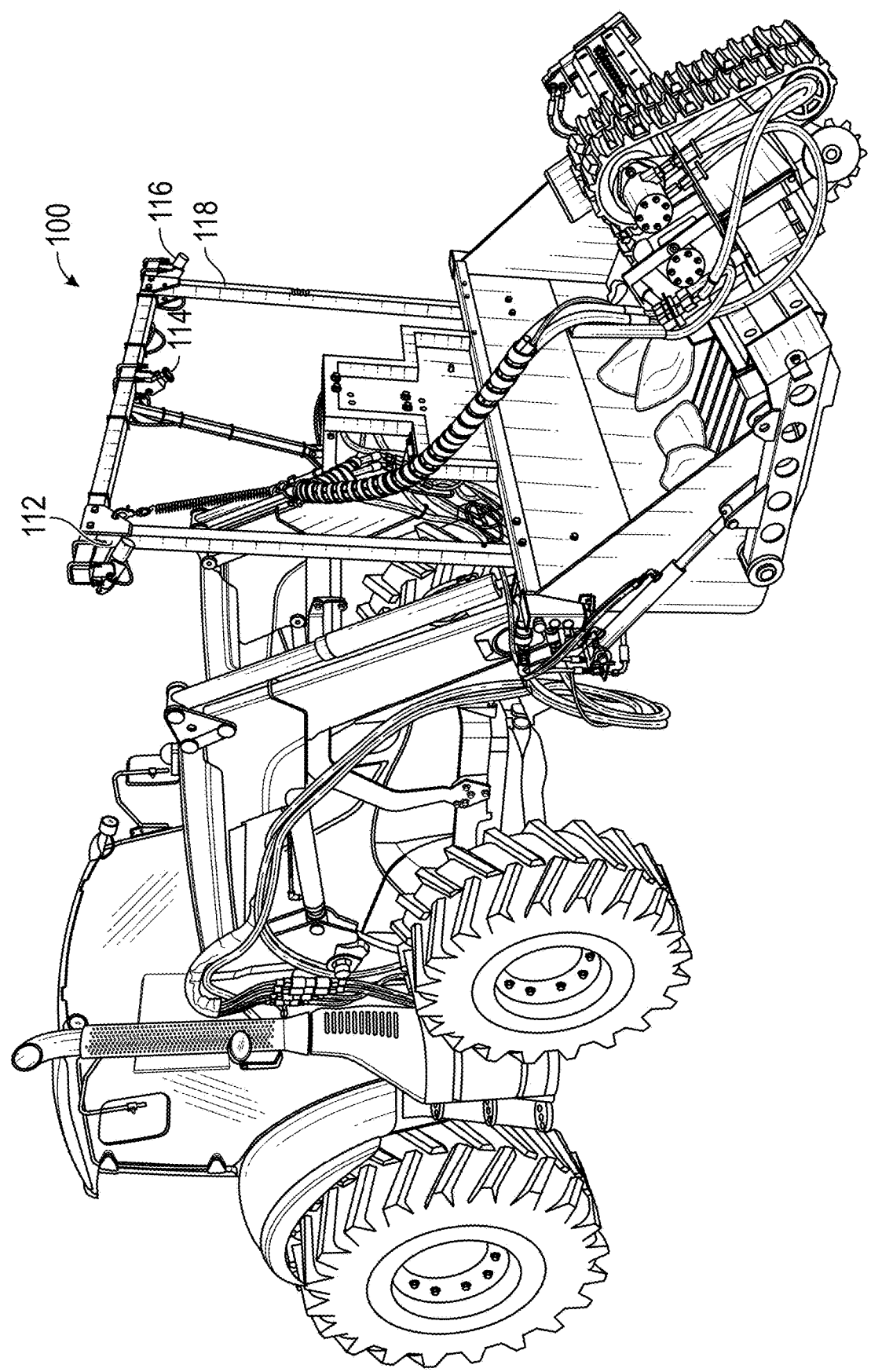
FIG. 1 is a perspective view of an intelligent multi-visual camera system mounted on a ground vehicle with an object-collection system in accordance with embodiments described herein.
Figure 2:
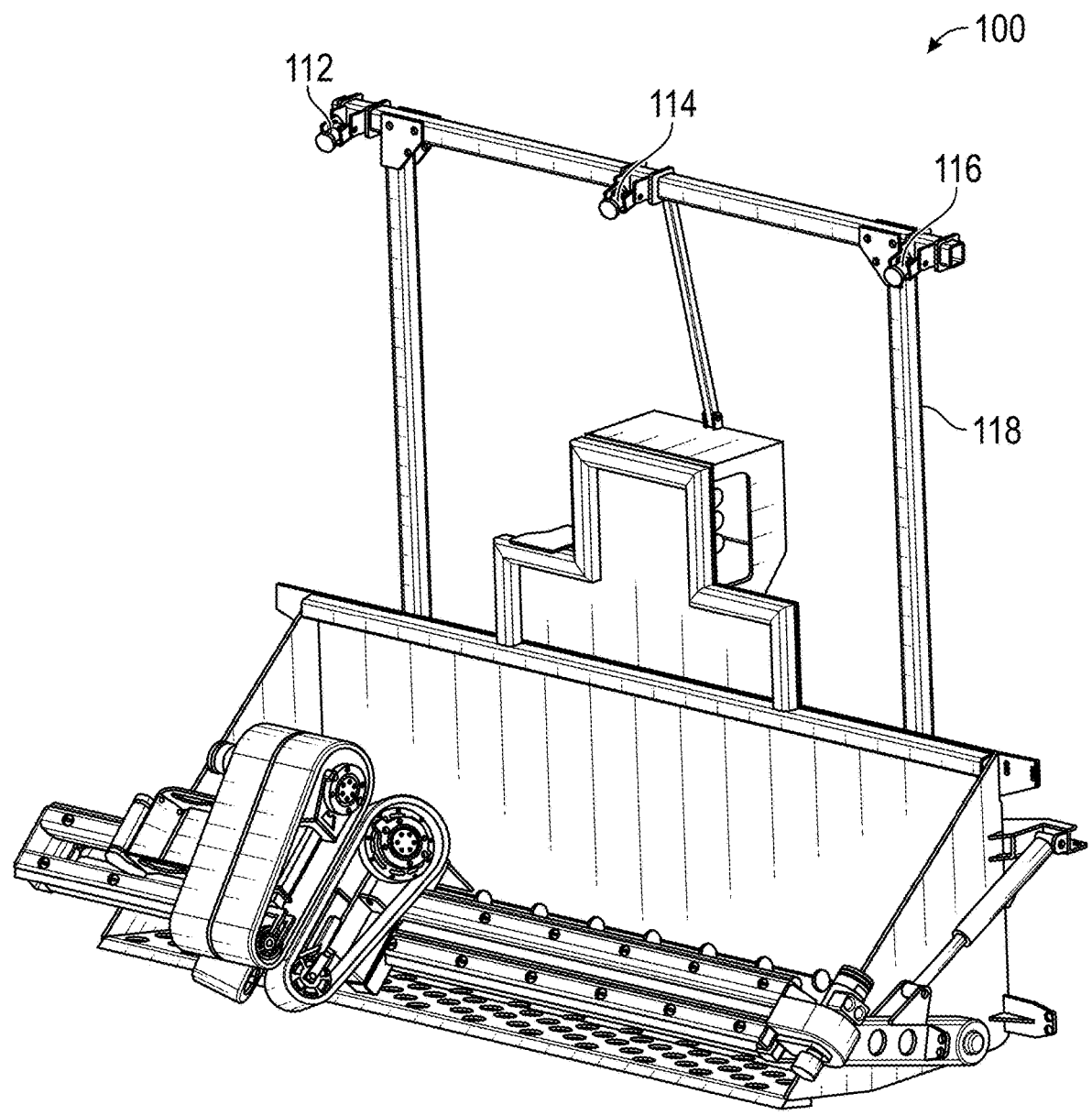
FIG. 2 is a perspective view of an intelligent multi-visual camera system mounted on an object-collection system in accordance with embodiments described herein.
Figure 3:
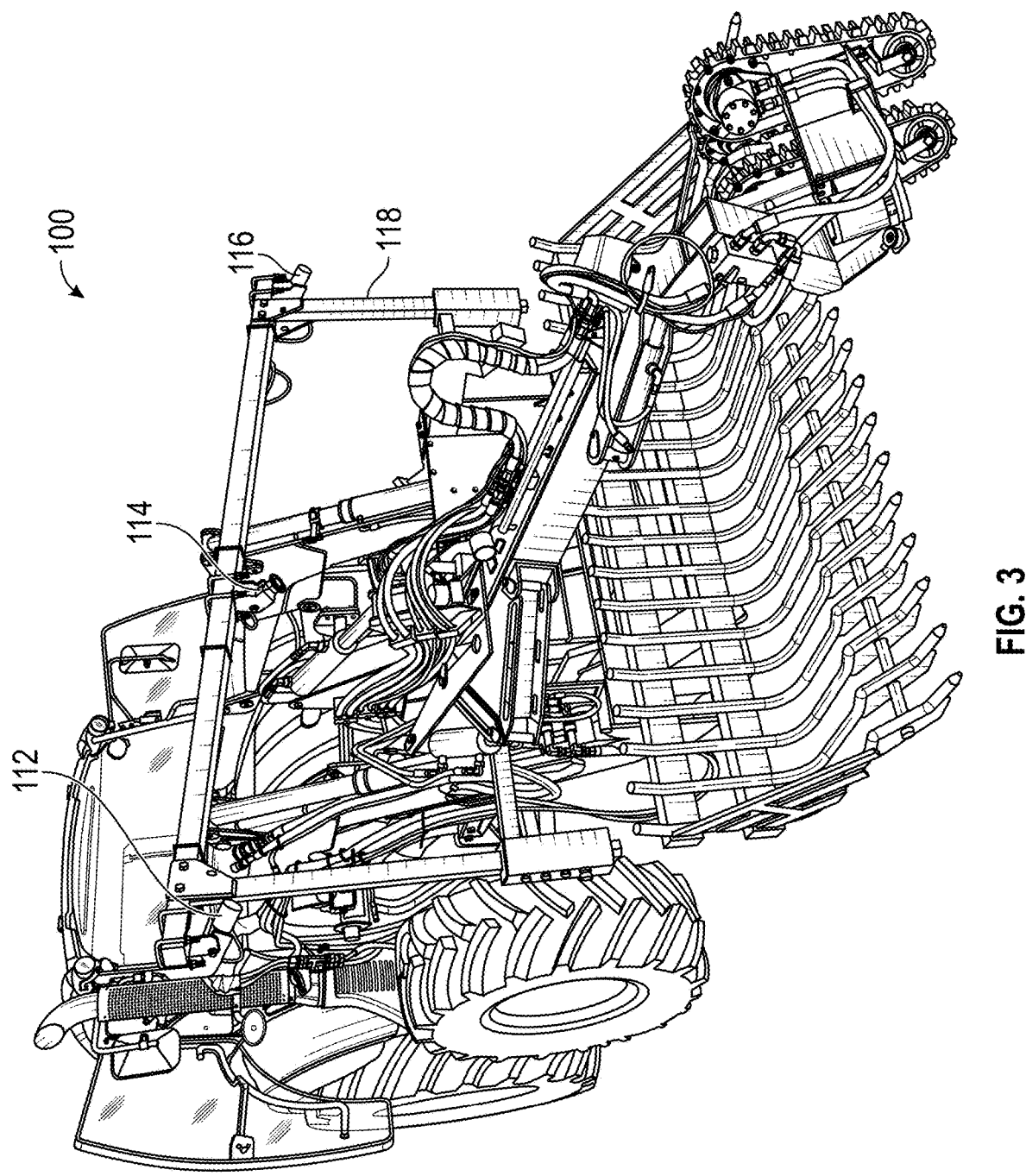
FIG. 3 is a perspective view of an intelligent multi-visual camera system mounted on a ground vehicle with another embodiment of an object-collection system in accordance with embodiments described herein.

Referring now to FIGS. 1, 2, and 3, in one or more implementations, an intelligent multi-visual camera system and method 100 may be used to identify objects within a configured distance of the equipment on which the intelligent multi-visual camera system is mounted. The intelligent multi-visual camera system also provides information about locations and trajectories of those objects relative to the equipment and its direction of travel. The intelligent multi-visual camera system further communicates information about locations and trajectories of those objects either to an operator in a manual system, or to actuators and/or control systems in a system with autonomous or semi-autonomous equipment and/or robotics. As shown in FIGS. 1, 2, and 3, in some implementations, the equipment on which the intelligent multi-visual camera system and method 100 is mounted is an object-collection system.

Figure 4:
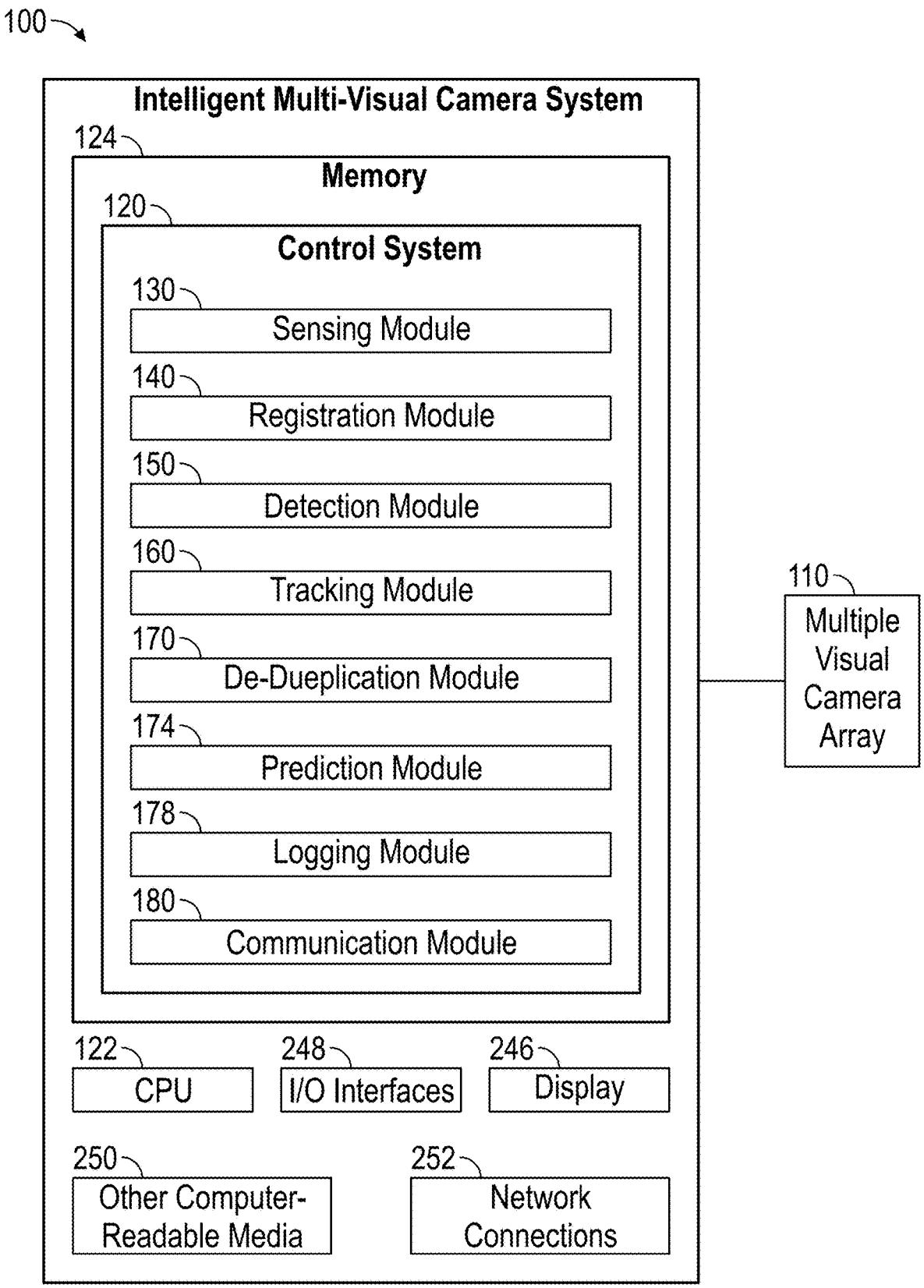
FIG. 4 is a component view of an intelligent multi-visual camera system including a multiple visual camera array and control system in accordance with embodiments described herein.
Figure 5:
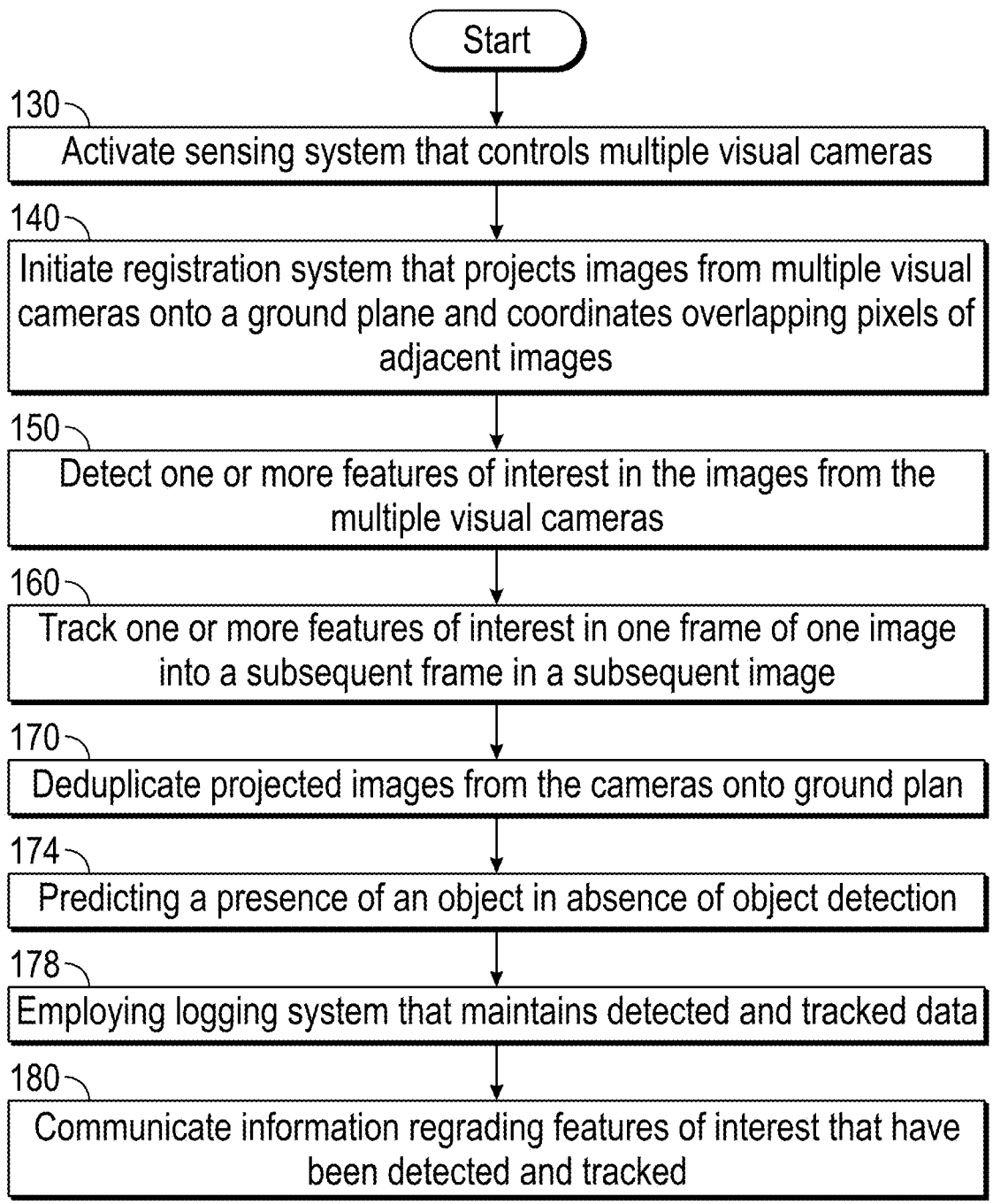
FIG. 5 is a logic diagram of the intelligent multi-visual camera method executing various operations in conjunction with the control system in accordance with embodiments described herein.

Referring now to FIGS. 4 and 5, as well as FIGS. 1-3, an intelligent multi-visual camera system and method 100 is disclosed that includes a multiple visual sensor array 110 and a control system 120. The multiple visual sensor array 110 includes multiple visual cameras 112, 114, and 116 spaced apart from each other. Each of the multiple visual cameras 112, 114, and 116 is mounted on a support frame 118, and each camera acquires its own independent image. The control system 120 includes a processor 122 and a memory 124. The control system 120 also receives input from the multiple visual cameras 112, 114, and 116, and stores instructions that cause the processor to: activate a sensing module 130 that controls the multiple visual cameras 112, 114, and 116; initiate a registration module 140 that projects images from the multiple visual cameras into a single three-dimensional volume, detect 150 one or more features of interest in the images from the multiple visual cameras 112, 114, and 116, track 160 one or more features of interest in one frame in one image into a subsequent frame in a subsequent image from the multiple visual cameras 112, 114, and 116, deduplicate 170 the projected images from the multiple visual cameras 112, 114, and 116 onto the ground plane; and communicate 180 information regarding the features of interest that have been detected.

As discussed above, one example of a piece of equipment or robotics that the intelligent multi-visual camera system and method 100 may connect to is a vehicle mounted, object-collection system. In some embodiments, the object-collection system may include a mechanical arm assembly, a receptacle, an end-effector, and a user input device. The mechanical arm assembly may have multiple degrees of freedom. The mechanical arm assembly may also be configured to pick up small objects off of a ground surface. The receptacle holds small objects that are picked up by the mechanical arm assembly. In one or more embodiments, the end-effector is positioned at a proximal end of the mechanical arm assembly. The end-effector is configured to grasp and acquire small objects from the ground surface using multiple paddles and belts that act like fingers to grab objects. In some embodiments, the user input device may provide operator control input from an operator on the ground vehicle to actuate the multiple degrees of freedom of the mechanical arm assembly and to actuate the end-effector. The user input signals from the user input device may be used to control electric or hydraulic actuators in the object collection system.

In various embodiments, the intelligent multi-visual camera system and method 100 may consume the processed information (e.g., communicate the information) in a variety of ways. In some embodiments, the intelligent multi-visual camera system and method 100 communicates the information visually via display to an operator of the equipment or robotics, informing the operator in real-time of relevant environmental information that has been sensed, tracked, and intelligently evaluated for objects or features of interest. In other embodiments, the intelligent multi-visual camera system and method 100 communicates the information by logging the information statistics on relevant environmental information for later processing. In still other embodiments that interface with autonomous or semi-autonomous equipment or robotics, the intelligent multi-visual camera system and method 100 communicates the information as instructions to a control system that is able to directly take action on the relevant environmental information (e.g., move a robotic arm to pick up an object; steer a vehicle to avoid an object; steer a vehicle, move a mechanical arm, and actuate an end-effector to pick up an object).

In one or more embodiments of the intelligent multi-visual camera system and method 100, the components (or operations) involved in the intelligent multi-visual camera system include, by way of example only, and not by way of limitation: sensing 130 (using a multiple visual sensor array 110), registration 140, detection 150, tracking 160, deduplication 170, prediction 174, logging 178, and communication 180. In some embodiments of the intelligent multi-visual camera system 100, less than all of these components (or operations) are included. For example, in one embodiment, the intelligent multi-visual camera system and method 100 includes the components (or operations) of: sensing 130 (using a multiple visual sensor array 110), registration 140, detection 150, tracking 160, deduplication 170, and communication 180.

The intelligent multi-visual camera system and method 100 includes memory 124, one or more central processing units (CPUs) 122, I/O interfaces 248, display 246, other computer-readable media 250, and optionally network connections 252. Network connections 252 include transmitters and receivers (not illustrated) to send and receive data to communicate with other components or computing devices. For example, network connections 252 can enable communication with the other actuator or control systems as part of the communication 180 with autonomous or semi-autonomous equipment or robotics. The intelligent multi-visual camera system and method 100 may include other computing components that are not shown for ease of illustration.

Memory 124 may include one or more various types of non-volatile or volatile storage technologies, or a combination thereof. Examples of memory 124 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 124 is utilized to store information, including computer-readable instructions that are utilized by CPU 122 to perform actions and embodiments described herein.

The intelligent multi-visual camera system and method 100 may utilize one or more artificial neural networks that are trained to identify, classify, and determine a location or size of objects in a geographical area based on sensor data collected from the multiple visual sensor array 110. In some embodiments, the intelligent multi-visual camera system and method 100 may include a plurality of sub-modules, such as a first module to identify objects, a second module to identify occluding objects, and a third module to model an estimated shape of the object based on output from the first and second modules.

Although embodiments described herein are referred to as using one or more artificial neural networks to identify objects, embodiments are not so limited and other computer vision algorithms or techniques may be used. For example, in some embodiments, shape-based algorithms, color-based algorithms, or other visual machine learning techniques may be employed to identify objects. In some embodiments, the computer vision algorithms or techniques may be selected by a user based on the type of object being identified or the conditions of the target geographical area. In yet other embodiments, machine learning techniques may be employed to learn which computer vision algorithms or techniques are most accurate or efficient for a type of object of condition.

Referring now to the sensing module 130 of the control system 120, the sensing is achieved in the intelligent multi-visual camera system and method 100 by imaging the environment using multiple visual cameras 112, 114, and 116 that are rigidly mounted on the equipment via a support frame 118. The number, type, and position of the cameras are configurable, which enables sensing over differently sized regions, at various resolution requirements, and using a variety of mediums. In some embodiments, the multiple visual cameras 112, 114, and 116 may be reoriented on the support frame 118 using motors or others actuators. Additionally, in some embodiments the multiple visual cameras 112, 114, and 116 may be moved along the support frame 118 (e.g., moved along a track) using motors or others actuators. Furthermore, in some embodiments, the support frame, along which the multiple visual cameras 112, 114, and 116 move, extends in multiple directions so that the multiple visual cameras may be moved along the x-axis (forward motion of the vehicle), y-axis (lateral motion), z-axis (vertical motion), or combinations thereof. In one example, the multiple visual sensor array 110 and sensing module 130 may be configured to detect rocks in farm fields within a 150 square foot sensing envelope in front of the tractor on which the intelligent multi-visual camera system 100 is mounted. The system may achieve this via 3 RGB (i.e., Red Green Blue) cameras at high resolution. Alternatively, the multiple visual sensor array 110 and sensing module 130 may be configured to sense within a 50 square foot sensing envelope using 2 infrared cameras providing imagery at lower resolution. Each camera takes its own independent image of the sensing envelope. These are coordinated in the subsequent registration step.

Referring now to the registration module 140 of the control system 120, the registration operation provides two significant outcomes. First, the images taken by the multiple visual cameras 112, 114, and 116 are projected into a three-dimensional volume.

Second, the overlapping pixels of adjacent images are coordinated amongst each other. Both of these computation operations are achieved by detecting common points in one frame from each camera with knowledge of those point locations relative to the reference ground plane. These detected common points are then used to characterize the geometry that transforms the images to an epipolar representation. Knowledge of these shared common point locations in the perspective-corrected images enables the registration module 140 to calculate offset values representing the translation between the images. This enables a mapping of features in one image to the equivalent features in any of the other images that overlap the same target geographical area. Referring now to the detection module 150 of the control system 120, the detection operator is executed on the images from the multiple visual cameras 112, 114, and 116 using a deep neural network to identify all features of interest in the environment. Through detection of a feature, the neural network in the detection module 150 obtains its classification, its pixel location in the image, and a representation of its boundary in the image. The neural network that is used is configurable, offering the potential for use in any environment, with any number of desired object classes.

Although embodiments described herein are referred to as using one or more artificial neural networks to identify objects, embodiments are not so limited and other computer vision algorithms or techniques may be used. For example, in some embodiments, shape-based algorithms, color-based algorithms, or other visual machine learning techniques may be employed to identify objects. In some embodiments, the computer vision algorithms or techniques may be selected by a user based on the type of object being identified or the conditions of the target geographical area. In yet other embodiments, machine learning techniques may be employed to learn which computer vision algorithms or techniques are most accurate or efficient for a type of object or condition.

Referring now to the tracking module 160 of the control system 120, the tracking operation receives an input describing a feature in one frame, and provides output identifying that same feature in a subsequent frame. This tracking operation offers two significant technological improvements. The first technological improvements are computational speed improvement and persistent feature association over sequential images. The computational speed improvement is achieved since tracking operations are less computationally intensive than detection operations. Therefore, the intelligent multi-visual camera system and method 100 intermittently replaces a detection operation with a tracking operation, thereby following the location of a previously detected feature rather than redundantly detecting the location of the feature again out of its full environment on each iteration. The second technological improvement is that performing this tracking operation simultaneously enables the control system 120 to distinguish two features in sequential images or associate two features in sequential images. Notably, knowledge of a single feature's position over time is beneficial in subsequent processing steps.

Referring now to the deduplication module 170 of the control system 120, the deduplication operation uses information from the registration operation to determine where the same objects have been identified by multiple cameras of the multiple visual cameras 112, 114, and 116. At the beginning of the deduplication operation, the control system 120 has sets of identified objects from each image that have been highlighted when the detection and tracking operations were executed on those images. In the deduplication operation, the control system 120 produces one single set of all objects identified in the total sensed search volume by removing any duplicate objects.

Referring now to the prediction module 174 of the control system 120, the prediction operation is used for operational planning and to compensate for the absence of detections of objects that were previously detected. Missing detection of objects may be caused by motion blur manifesting in the imagery, physical occlusion, intentional programmatic blocking of detections, or some other cause for a missed detection. Prediction is made possible by the prediction module 174 logging positions over time of objects that have been associated in the tracking operation. In some embodiments, mathematical models are used to convert known historical positions over time into predicted present and future positions. The prediction module 174 of the control system 120 enables estimated object locations to be determined when measured locations are not available. In some embodiments, the prediction module 174 calculates information on the trajectory of the objects. Additionally, in some embodiments the prediction module 174 estimates the amount of time it will take for the intelligent multi-visual camera system 100 to reach a given destination.

Referring now to the logging module 178 of the control system 120, the logging operation has been configured to enable quality assessment as well as a means of collecting data to improve future operations. This logging module 178 employs artificial intelligence and a feedback loop involving real world operations to provide continuous performance improvement. Information is written to a set of files by the logging module 178 to be retrieved after operation.

Referring now to the communication module 180 of the control system 120, the communication operation may be carried out in a variety of ways depending on the type of system (e.g., manual system, semi-autonomous system, or fully autonomous system). For example, in a manual system, the communication medium is connected to an operator through a visual display. In one embodiment, the intelligent multi-visual camera system 100 may display the collected imagery as individual camera feeds. In another embodiment, the intelligent multi-visual camera system 100 may display the collected imagery as a single synthesized view of the scene, provided that the camera feeds overlap with each other. In either display embodiment, every processing operator may be represented visually by overlaying boxes onto the imagery. In some embodiments of the communication module 180, information is written to a file to be retrieved after operation. In other embodiments that are used in autonomous or semi-autonomous systems, instructions based on the determined environmental information are communicated to the subsequent system, such as motors, actuator controls, or operational control software. Such instructions may be to a control system that is able to directly take action using the relevant environmental information (e.g., move a robotic arm to pick up an object; steer a vehicle to avoid an object; steer a vehicle, move a mechanical arm, and actuate an end-effector to pick up an object).

Disparity Shift System

The disparity shifting system leverages the knowledge that the intended operating envelope of the stereo vision system is known. This enables optimization of a stereo disparity calculation and technological improvement of the stereo vision system.

Figure 6:
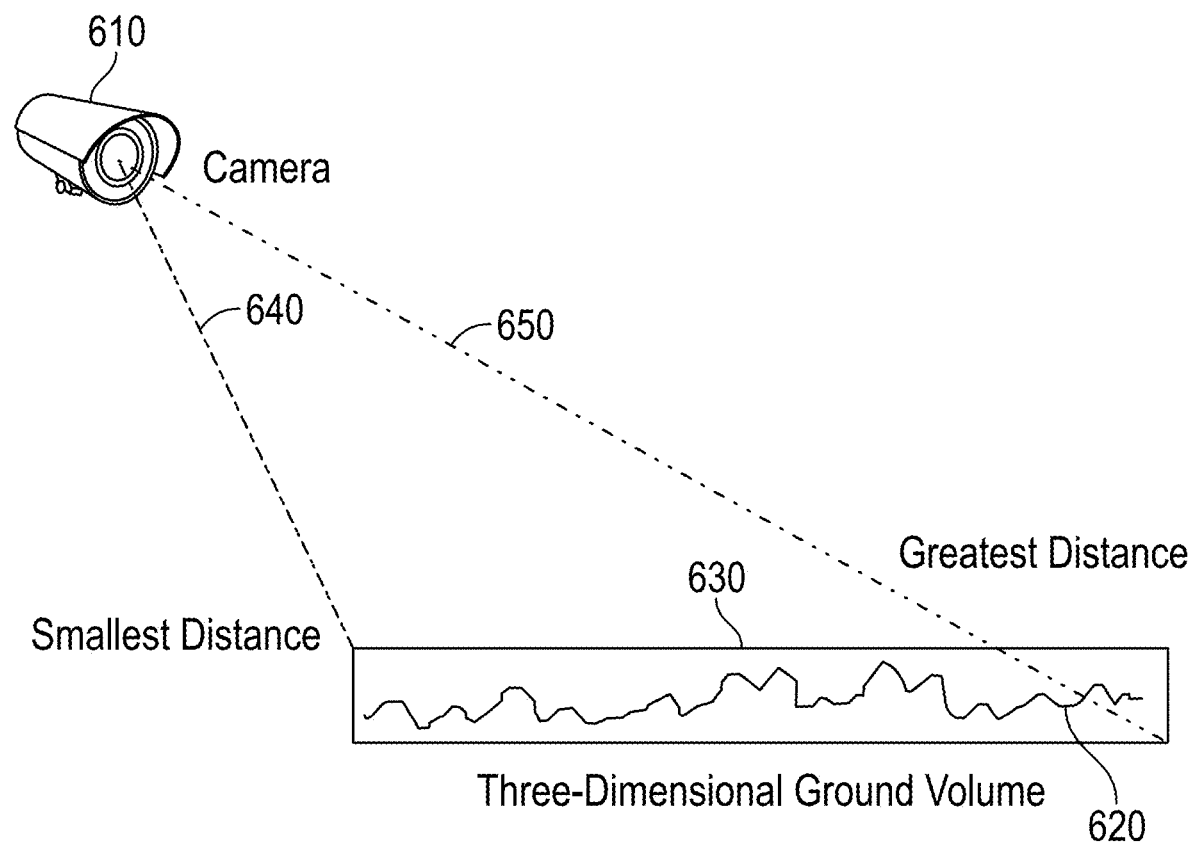
FIG. 6 shows a schematic representation of a camera viewing a section of three-dimensional ground volume that is represented by a rectangular box.

Referring now to FIG. 6, a schematic representation is shown of an expected scene in which a camera 610 is viewing a section of three-dimensional ground volume. In this embodiment, the camera 610 is shown at the top left, while the ground 620 is represented by a wavy line at the bottom of the figure. Traditionally, an expected range of reasonable features on the ground 620, would be modelled as represented by the rectangular box 630. The first and second rays 640 and 650 represent the greatest and smallest distances in the scene (i.e., the first ray 640 represents the smallest distance and the second ray 650 represents the greatest distance). To compute the three-dimensional coordinates in the scene, a volume large enough to accommodate both the small and large distances must be searched.

Figure 7:
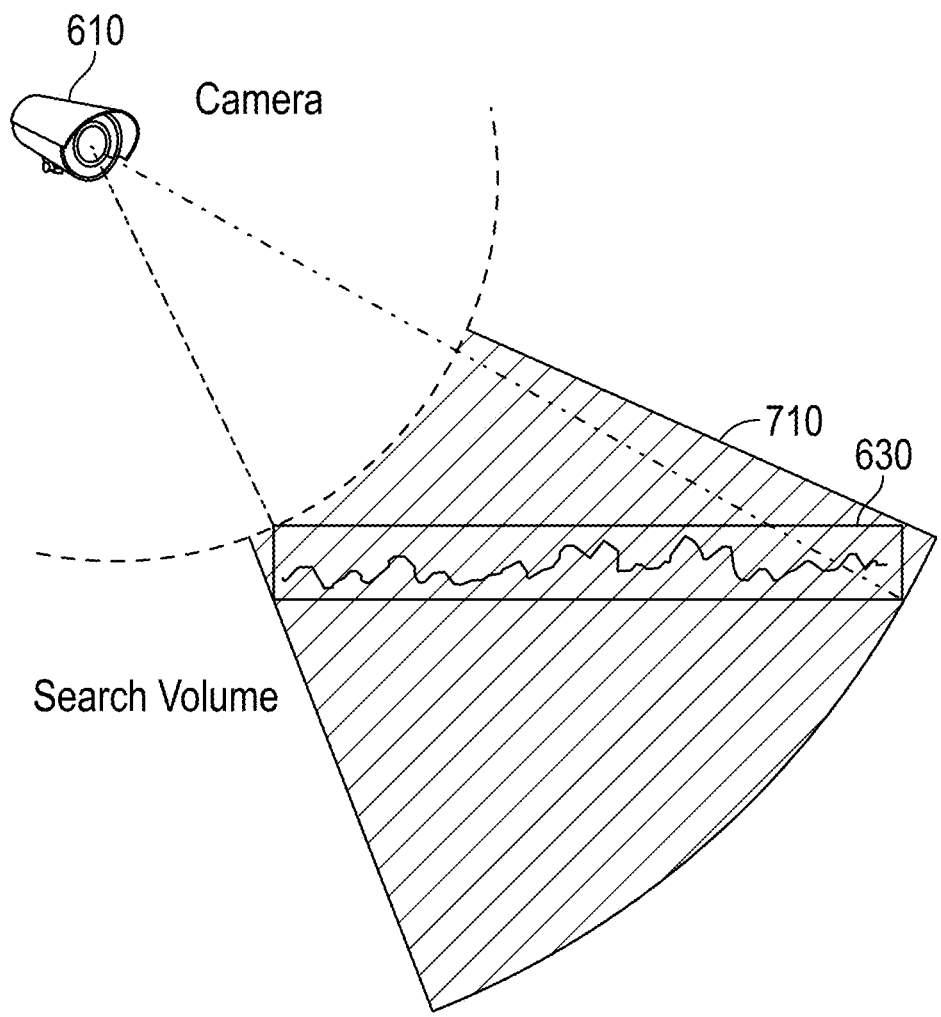
FIG. 7 shows a schematic representation of the search volume required to cover the entire three-dimensional volume represented by the rectangular box.

Referring now to FIG. 7, this diagram displays the search volume 710 (i.e., the truncated cone shaped volume shown in dashed lines) required to cover the entire three-dimensional volume represented by the rectangular box. As discussed above with respect to FIG. 6, the region of interest is represented by the rectangular box 630. Accordingly, the search volume outside of the rectangular box (i.e., the search volume 710 minus the rectangular box 630) represents wasted computation. Furthermore, the search volume outside of the rectangular box also increases that possibility of possible false positive matches for a depth finding system. Thus, any way to reduce the size of the search volume outside of the rectangular box represents a technological improvement to the stereo vision system.

Figure 8:
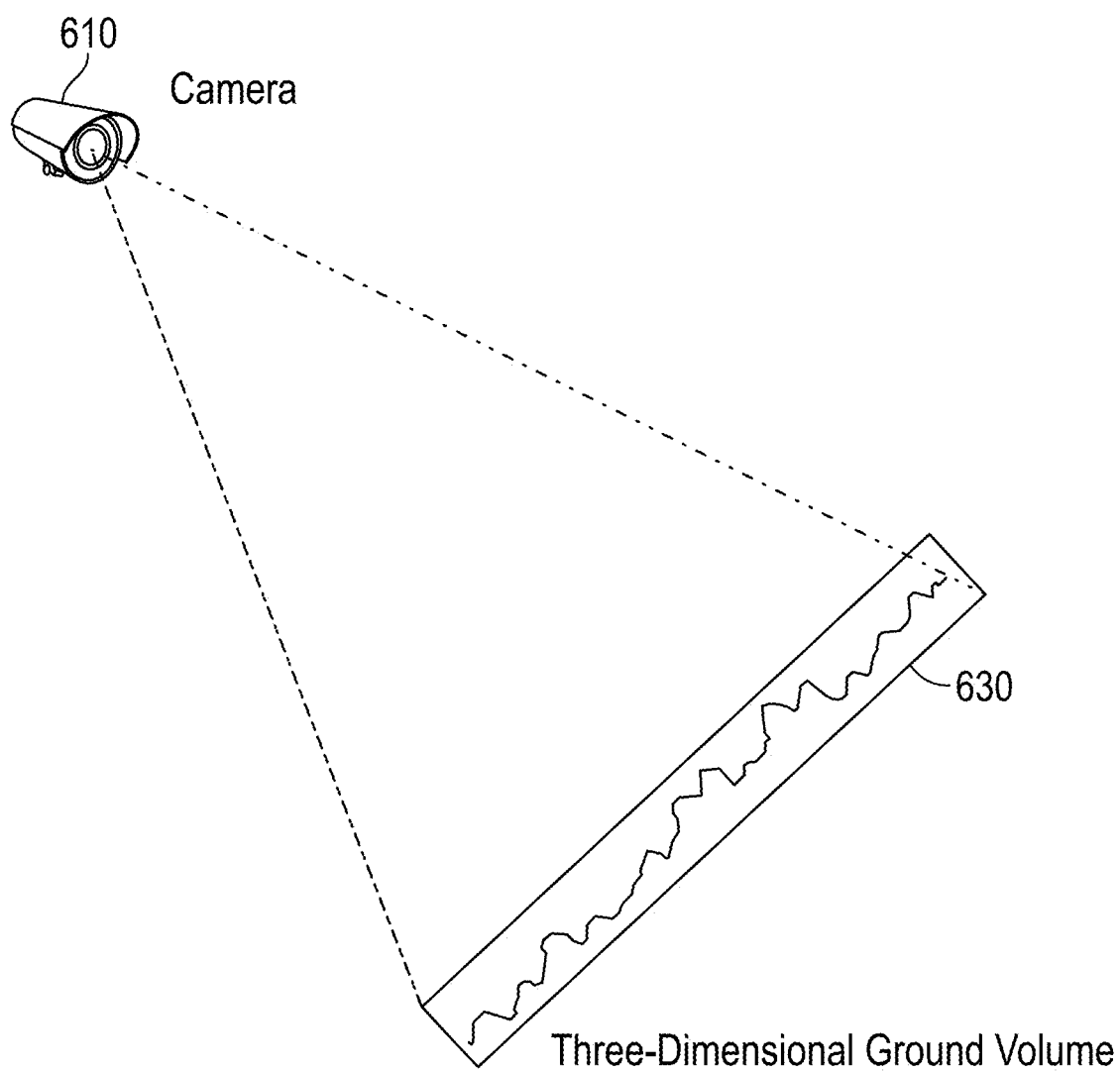
FIG. 8 shows a schematic representation of an image re-projection that reduces the search space by rotating the rectangular box.

Referring now to FIG. 8, this figure displays an image re-projection that reduces the search space by rotating the rectangular box 630. Specifically, this search enhancing re-projection is achieved by performing a large shift parallel to the epipolar line at the bottom of the images. A smaller shift is also made at the top of the images. This search enhancing technique creates an effective shift in perspective, which transforms the viewpoint from oblique to nearly orthographic.

Epipolar geometry is the geometry of stereo vision. When two cameras view a 3D scene from two distinct positions, there are a number of geometric relations between the 3D points and their projections onto the 2D images that lead to constraints between the image points. With two stereo cameras, a line may be seen by a left camera as a point because it is directly in line with that camera's lens optical center. However, the right camera sees this line as a line in its image plane. That line in the right camera is called an epipolar line.

Figure 9:
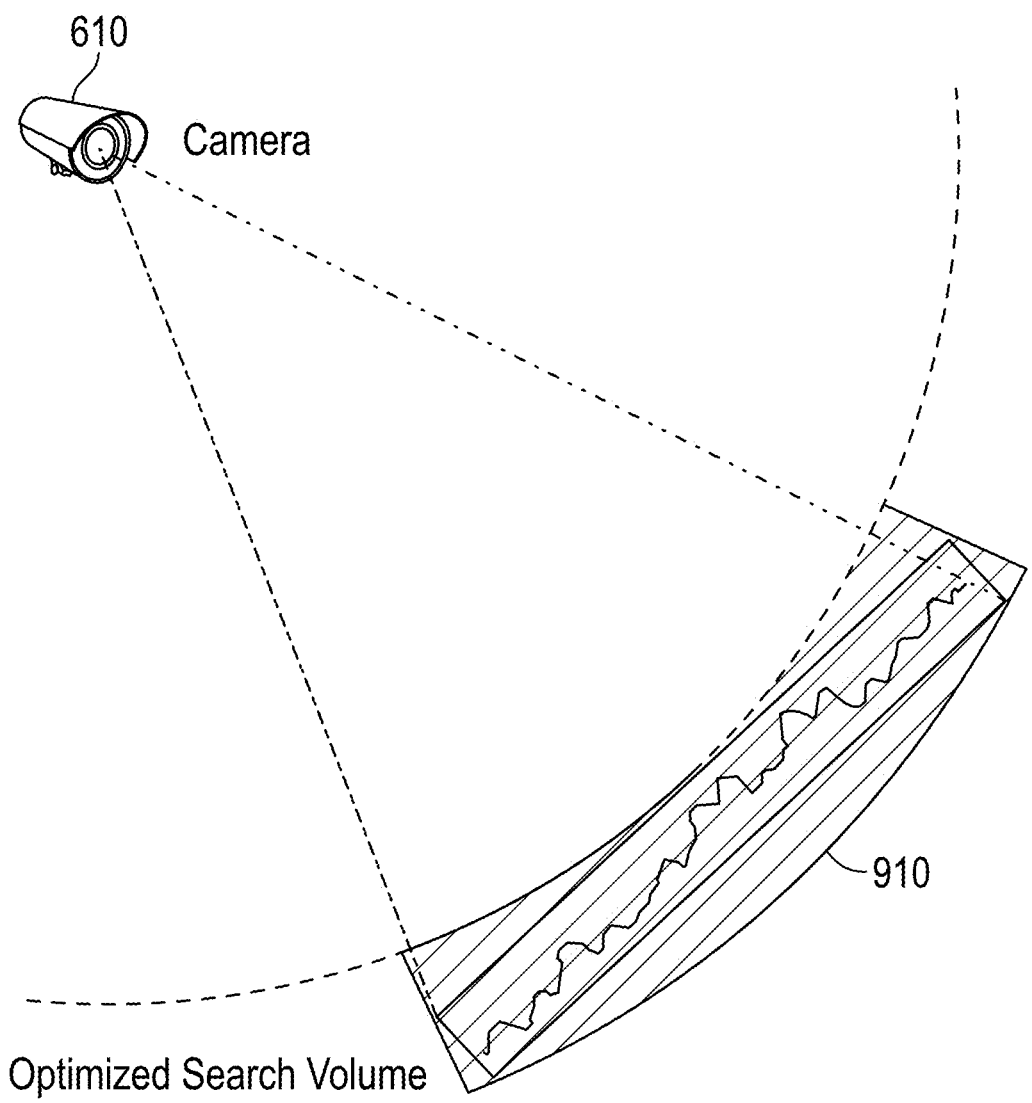
FIG. 9 shows a schematic representation of the performance gains achieved by the search volume optimization system.
Figure 10:
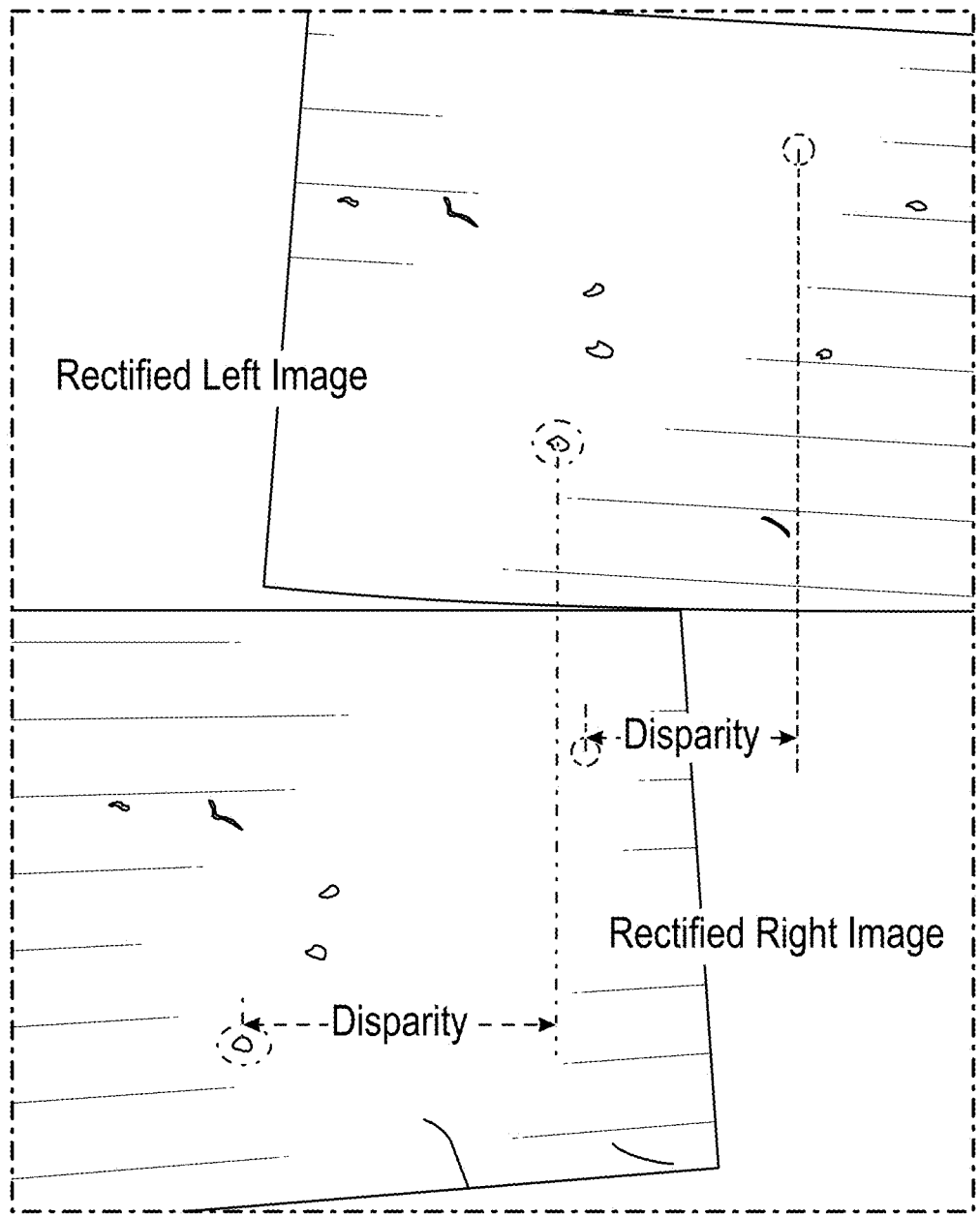
FIG. 10 shows a rectified stereo pair of images that are taken by the stereo vision camera system.
Figure 11:
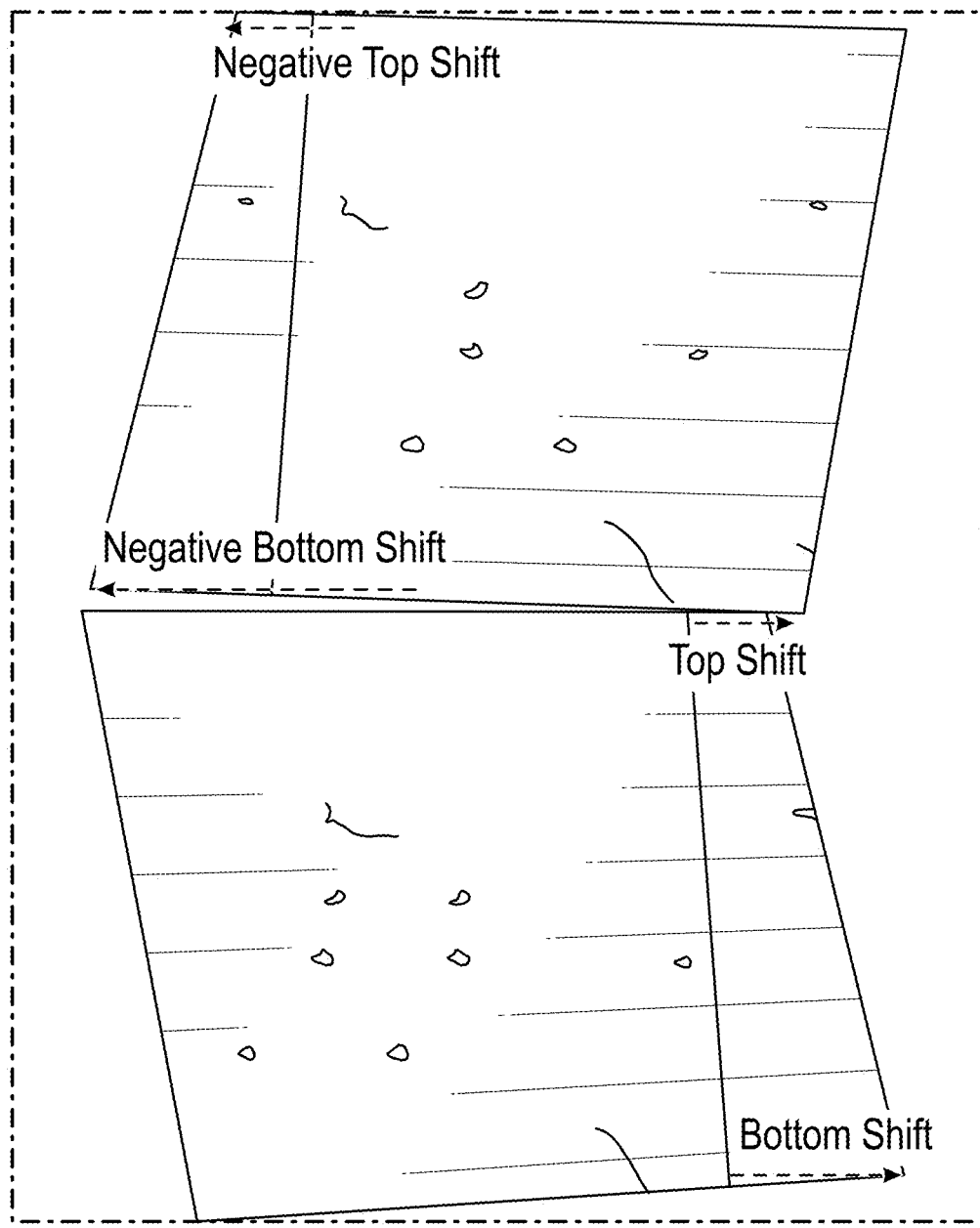
FIG. 11 shows a geometric transformation employed on the rectified stereo pair of images by this search enhancement technique.
Figure 12:
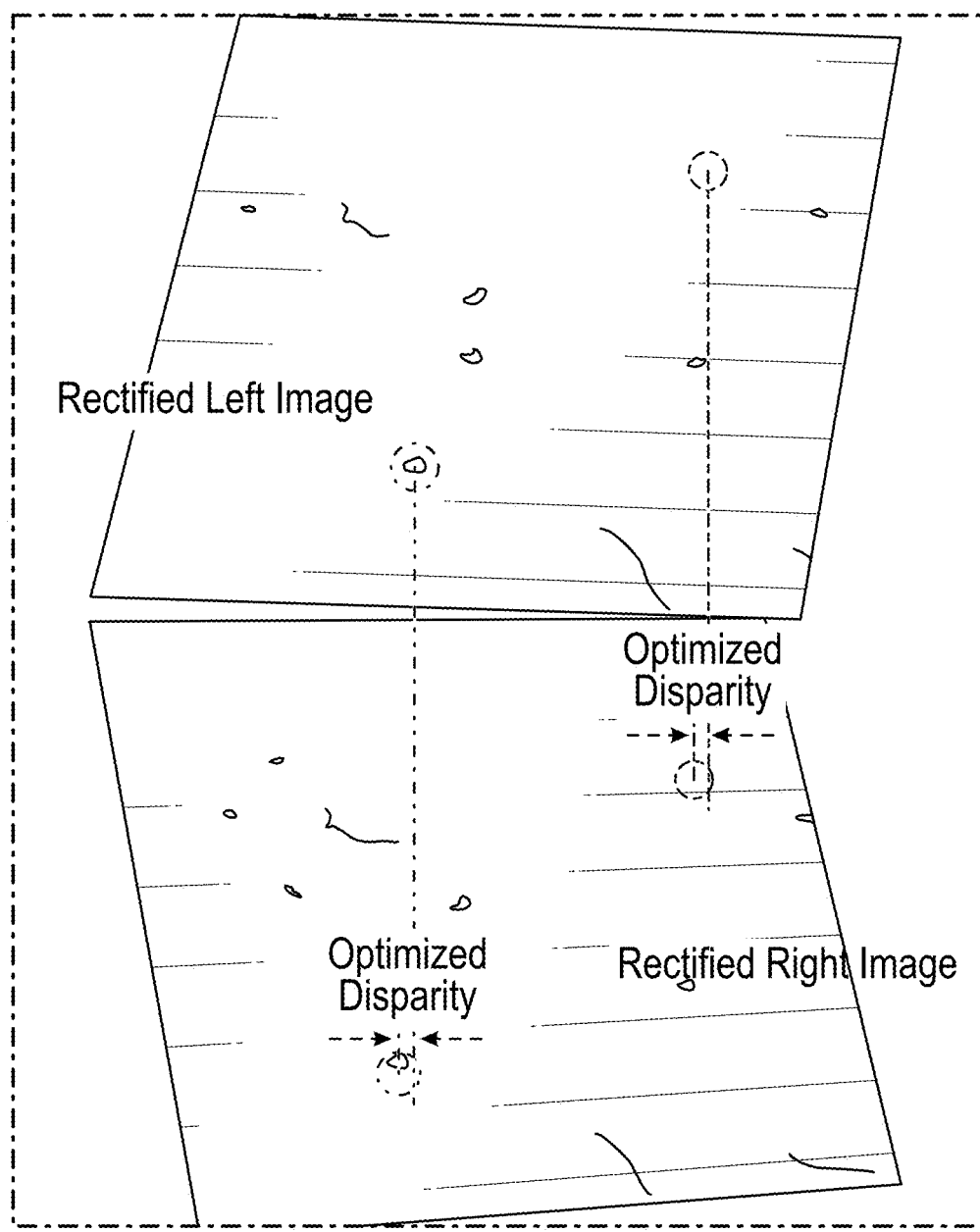
FIG. 12 shows the computational improvement of the search enhancement technique by reduced disparity in the rectified stereo pair of images.

Referring now to FIG. 9, this figure qualitatively displays the performance gains achieved by the search volume optimization system, namely the optimized search volume 910 is dramatically smaller when this technological improvement is implemented. Notably, this technique also requires modelling a priori the search volume. As such, anything outside of this search volume does not produce a valid depth estimate. FIGS. 10-12 illustrate various examples of the search enhancement technique.

Referring now to FIG. 10, a rectified stereo pair of images are shown that are taken from the stereo vision camera system. In this embodiment, a selection of features which are matched between the left and right images are shown in short dashes and longer dashes. The nearer features (i.e., short dashes) have a significantly greater disparity than distant features (i.e., longer dashes). Traditional commonly used stereo algorithms (e.g., a sign of absolute difference algorithm) search along horizontal lines in these images for matching features, and report the distance that each feature in the right image must be shifted to match those in the left image. This distance is called the disparity. The resulting figure is a disparity map, with a potentially different disparity value for each pixel.

Referring now to FIG. 11, the geometric transformation is shown around which this search enhancement technique is based. By shifting the bottom of the images by large amounts, and shifting the top of the images by comparatively smaller amounts, the camera perspective is effectively shifted. In the embodiment shown in FIG. 11 both the left and right images have been shifted by equal and inverse amounts. In other embodiments (not shown), the right image is shifted by twice the magnitude and the left image is not shifted at all. In still other embodiments (not shown), the left image is shifted by twice the magnitude and the right image is not shifted at all. Notably, this geometric transformation technique requires that the total amount of shifted pixels between the two images is the same.

Referring now to FIG. 12, the computational improvement of the search enhancement technique is clearly shown. FIG. 12 illustrates just how dramatically the disparity has been reduced for both example features. Significantly, the dynamic range of the disparity has also decreased tremendously. First, this geometric transformation technique provides an immediate improvement in computational efficiency because the disparity search range is reduced by an order of magnitude. Second, and also very significantly in terms of search results quality, the larger un-transformed search volume would produce many potential false matches between the left and right images. By optimizing the search volume, the number of false positives is substantially decreased, thereby improving the stereo vision system and search enhancement technique.

In the final stage of one embodiment of the search enhancement technique, a correction algorithm is applied to revise the disparity values for the shift. Since the shifting is constant over rows, the resulting formula for the disparity unshift is a function of image row. In the current search enhancement technique, the top of the image corresponds to row=0. The bottom shift and top_shift parameters in the formula below represent the total amount of shift in both the left and right images. The formula is:

$$\text{disparity\_unshift (row)} = \text{row} * (\text{bottom\_shift} - \text{top\_shift}) / \text{rectified\_image\_height} + \text{top\_shift}$$

Given the stereo disparity, the x-y pixel coordinates of these features, and the stereo camera geometry, the stereo camera vision system is able calculate the three-dimensional position (including scale) of these points relative to the camera system.

Figure 13:
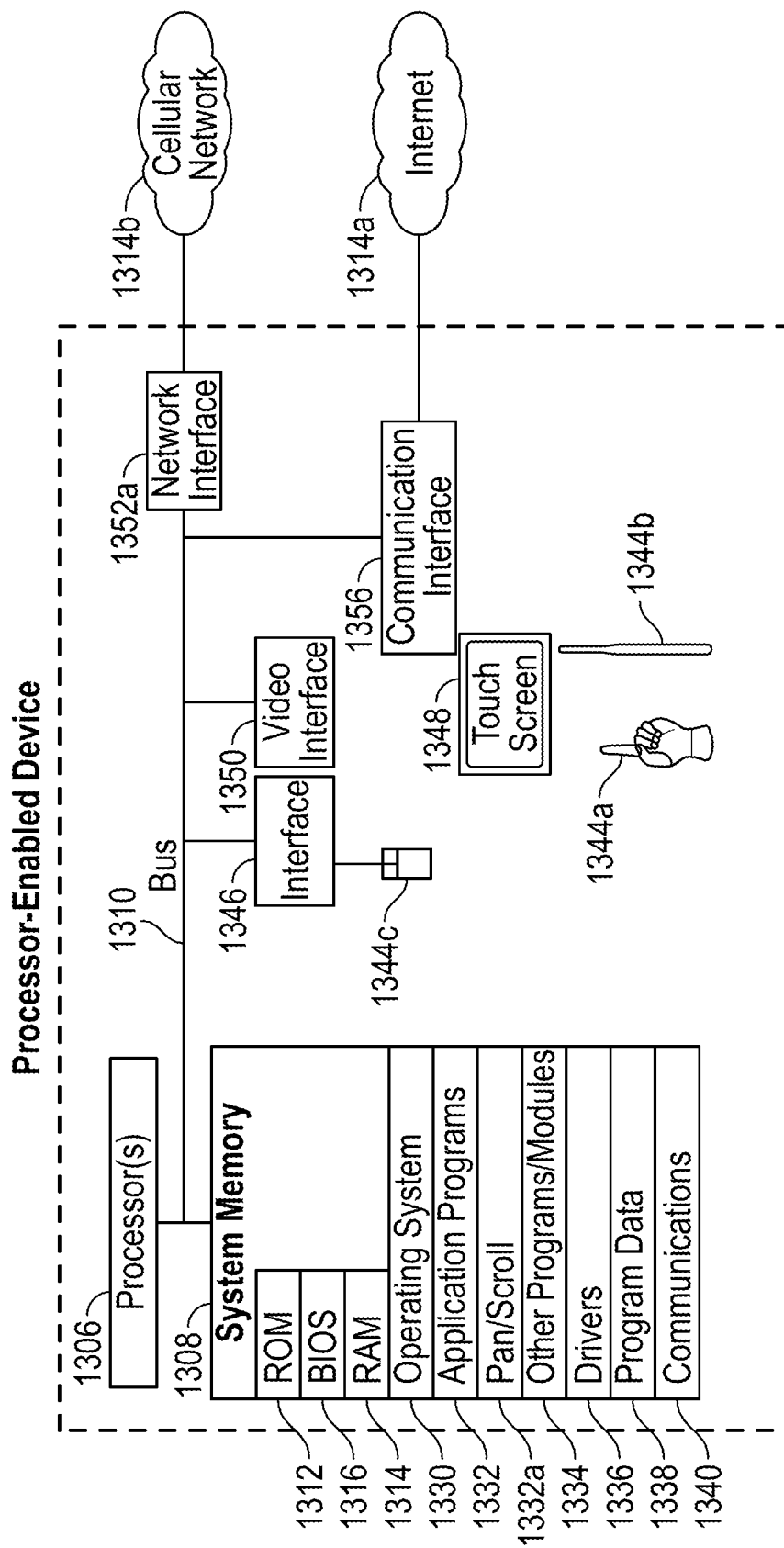
FIG. 13 is a block diagram of an example processor based device used to implement one or more of the electronic devices described herein.

For use in conjunction with the system for stereo camera vision system, FIG. 13 shows a processor-based device suitable for implementing the system for stereo camera vision system. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

In the system for stereo camera vision system, the processor-based device may include one or more processors 1306, a system memory 1308 and a system bus 1310 that couples various system components including the system memory 1308 to the processor(s) 1306. The processor-based device will, at times, be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, and 68xxx series microprocessors from Motorola Corporation. The system memory 1308 may be located on premises or it may be cloud based.

The processor(s) 1306 in the processor-based devices of the system for stereo camera vision system may be any logic processing unit, such as one or more central processing units (CPUs), microprocessors, digital signal processors (DSPs), application-specific integrated circuits (ASICs), field programmable gate arrays (FPGAs), and the like. Unless described otherwise, the construction and operation of the various blocks shown in FIG. 13 are of conventional design. As a result, such blocks need not be described in further detail herein, as they will be understood by those skilled in the relevant art.

The system bus 1310 in the processor-based devices of the system for stereo camera vision system can employ any known bus structures or architectures, including a memory bus with memory controller, a peripheral bus, and a local bus. The system memory 1308 includes read-only memory ("ROM") 1312 and random access memory ("RAM") 1314. A basic input/output system ("BIOS") 1316, which can form part of the ROM 1312, contains basic routines that help transfer information between elements within processor-based device, such as during start-up. Some implementations may employ separate buses for data, instructions and power.

The processor-based device of the system for stereo camera vision system may also include one or more solid state memories; for instance, a Flash memory or solid state drive (SSD), which provides nonvolatile storage of computer-readable instructions, data structures, program modules and other data for the processor-based device. Although not depicted, the processor-based device can employ other nontransitory computer- or processor-readable media, for example, a hard disk drive, an optical disk drive, or a memory card media drive.

Program modules in the processor-based devices of the system for stereo camera vision system can be stored in the system memory 1308, such as an operating system 1330, one or more application programs 1332, other programs or modules 1334, drivers 1336 and program data 1338.

The application programs 1332 may, for example, include panning/scrolling 1332*a*. Such panning/scrolling logic may include, but is not limited to, logic that determines when and/or where a pointer (e.g., finger, stylus, cursor) enters a user interface element that includes a region having a central portion and at least one margin. Such panning/scrolling logic may include, but is not limited to, logic that determines a direction and a rate at which at least one element of the user interface element should appear to move, and causes updating of a display to cause the at least one element to appear to move in the determined direction at the determined rate. The panning/scrolling logic 1332*a* may, for example, be stored as one or more executable instructions. The panning/scrolling logic 1332*a* may include processor and/or machine executable logic or instructions to generate user interface objects using data that characterizes movement of a pointer, for example, data from a touch-sensitive display or from a computer mouse or trackball, or other user interface device.

The system memory 1308 in the processor-based devices of the system for stereo camera vision system may also include communications programs 1340, for example, a server and/or a Web client or browser for permitting the processor-based device to access and exchange data with other systems such as user computing systems, Web sites on the Internet, corporate intranets, or other networks as described below. The communications program 1340 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 13 as being stored in the system memory 1308, operating system 1330, application programs 1332, other programs/modules 1334, drivers 1336, program data 1338 and server and/or browser can be stored on any other of a large variety of nontransitory processor-readable media (e.g., hard disk drive, optical disk drive, SSD and/or flash memory).

A user of a processor-based device in the system for stereo camera vision system can enter commands and information via a pointer, for example, through input devices such as a touch screen 1348 via a finger 1344*a,* stylus 1344*b,* or via a computer mouse or trackball 1344*c* which controls a cursor.

Other input devices can include a microphone, joystick, game pad, tablet, scanner, biometric scanning device, and the like.

These and other input devices (i.e.,"I/O devices") are connected to the processor(s) 1306 through an interface 1346 such as a touch-screen controller and/or a universal serial bus ("USB") interface that couples user input to the system bus 1310, although other interfaces such as a parallel port, a game port or a wireless interface or a serial port may be used. The touch screen 1348 can be coupled to the system bus 1310 via a video interface 1350, such as a video adapter to receive image data or image information for display via the touch screen 1348. Although not shown, the processor-based device can include other output devices, such as speakers, vibrator, haptic actuator or haptic engine, and the like.

The processor-based devices of the system for stereo camera vision system operate in a networked environment using one or more of the logical connections to communicate with one or more remote computers, servers and/or devices via one or more communications channels, for example, one or more networks 1314a, 1314b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based devices of the system for stereo camera vision system may include one or more network, wired or wireless communications interfaces 1352a, 1356 (e.g., network interface controllers, cellular radios, WI-FI radios, Bluetooth radios) for establishing communications over the network, for instance, the Internet 1314a or cellular network 1314b.

In a networked environment, program modules, application programs, or data, or portions thereof, can be stored in a server computing system (not shown). Those skilled in the relevant art will recognize that the network connections shown in FIG. 13 are only some examples of ways of establishing communications between computers, and other connections may be used, including wirelessly.

For convenience, the processor(s) 1306, system memory 1308, and network and communications interfaces 1352a, 1356 are illustrated as communicably coupled to each other via the system bus 1310, thereby providing connectivity between the above-described components. In alternative implementations of the processor-based device, the above-described components may be communicably coupled in a different manner than illustrated in FIG. 13. For example, one or more of the above-described components may be directly coupled to other components, or may be coupled to each other, via intermediary components (not shown). In some implementations, system bus 1310 is omitted, and the components are coupled directly to each other using suitable connections. Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), one or more communicative link(s) through one or more wireless communication protocol(s), and/or optical pathways (e.g., optical fiber), and exemplary communicative couplings include, but are not limited to, electrical couplings, magnetic couplings, wireless couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," "to, at least, provide," "to, at least, transmit," and so on.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other portable and/or wearable electronic devices, not necessarily the exemplary wearable electronic devices generally described above.

For instance, the foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs executed by one or more computers (e.g., as one or more programs running on one or more computer systems), as one or more programs executed by one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

Operations of processes described herein can be performed in any suitable order unless otherwise indicated herein or otherwise clearly contradicted by context. The processes described herein (or variations and/or combinations thereof) are performed under the control of one or more computer systems configured with executable instructions and are implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lacks all of the code while the multiple non-transitory computer-readable storage media collectively store all of the code. In an embodiment, the executable instructions are executed such that different instructions are executed by different processors—for example, a non-transitory computer-readable storage medium stores instructions and a main CPU executes some of the instructions while a graphics processor unit executes other instructions. In an embodiment, different components of a computer system have separate processors, and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure. All references, including publications, patent applications, and patents, cited herein are hereby incorporated by reference to the same extent as if each reference were individually and specifically indicated to be incorporated by reference and were set forth in its entirety herein.

The invention claimed is:

1. A method of using an intelligent multi-visual camera system, the method comprising:
    providing a multiple visual sensor array including multiple visual cameras spaced apart from each other, wherein each of the multiple visual cameras is mounted on a support frame, wherein each camera acquires its own independent image;
    initiating a registration system that projects images from the multiple visual cameras into a single three-dimensional volume;
    detecting features of interest in the images from the multiple visual cameras using a neural network, wherein detection of features of interest includes classification, pixel location in the image, and boundary representation in the image;
    identifying a feature of interest in one frame in an image from the multiple visual cameras, and identifying the same feature of interest in a subsequent frame in an image from the multiple visual cameras, which provides improved computational speed and persistent feature association over sequential images;
    projecting the features of interest from the multiple visual cameras into the three-dimensional volume to identify instances where the same objects have been identified by multiple cameras and ensure unique features of interest;
    limiting the three-dimensional volume around a ground plane, wherein a search volume is a truncated curved cone shaped volume that covers the three-dimensional volume represented by a rectangular box
    reducing a size of the search volume by rotating the search volume, transforming a position of the search volume from oblique to orthographic, and further truncating the curved cone shaped volume;
    predicting, through the search volume, a presence of an object in the absence of object detection by logging positions of objects over time;
    employing a logging system that uses a feedback loop to assess quality of collected data; and
    displaying collected imagery as a single synthesized view of camera feed overlap from the multiple visual cameras with overlaying boxes on the displayed collected imagery identifying objects of interest.

2. The method of claim 1, wherein a number, type, and position of the multi-visual cameras are configurable, enabling sensing over differently sized regions, at various resolution requirements.

3. The method of claim 1, wherein the multiple cameras of the multi-visual camera system receive visual sensory information over a larger region than a single camera without loss in image quality.

4. The method of claim 1, wherein projecting the features of interest from the multiple visual cameras into the three-dimensional volume further comprises:

detecting shared common points in one frame from each camera with data associated with shared common point locations within the three-dimensional volume.

5. The method of claim 4, wherein projecting the features of interest from the multiple visual cameras into the three-dimensional volume further comprises:
using the shared common point locations to characterize a geometry that transforms the images to an epipolar representation.

6. The method of claim 5, wherein projecting the features of interest from the multiple visual cameras into the three-dimensional volume further comprises:
calculating row-dependent shifts parallel to epipolar lines.

7. The method of claim 6, wherein projecting the features of interest from the multiple visual cameras into the three-dimensional volume further comprises:
providing mapping features in one image from the multiple visual cameras to equivalent features in other images from other cameras of the multiple visual cameras that overlap the same search volume.

8. The method of claim 1, wherein projecting the features of interest from the multiple visual cameras into the three-dimensional volume further comprises:
increasing computational speed and accuracy of a stereo disparity calculation by limiting feature search volume.

9. The method of claim 1, wherein computational speed improvement is achieved by the method since tracking operations are less computationally demanding than detection operations, whereby a detection operation is intermittently replaced with a tracking operation, following the location of a previously detected feature rather than redundantly detecting a feature location out of a full environment on each iteration.

10. The method of claim 1, wherein a tracking operation simultaneously enables confirmation of distinguishing two features in sequential images or associating two features in sequential images.

11. The method of claim 1, wherein projecting the features of interest from the multiple visual cameras into the three-dimensional volume to identify instances where the same objects have been identified by multiple cameras and ensure unique features of interest further comprises:
determining sets of identified objects from each image which have been highlighted in the detecting and the tracking of those images, and producing a single set of all objects identified in a total sensed search volume by removing duplicate objects in the three-dimensional volume.

12. The method of claim 1, wherein predictive ego-tracking provides an estimation of platform motion through the three-dimensional volume and can provide an estimated time to reach a location within the three-dimensional volume.

13. The method of claim 1, wherein the logging system uses artificial intelligence to provide continuous performance improvement.

14. The method of claim 1, wherein, when used in an autonomous or semi-autonomous system, instructions based on known environmental information are communicated to actuator controls, operational control software, or both.

15. The method of claim 1, wherein the intelligent multi-visual camera system further comprises one or more of visual, infra-red, multi spectral imaging, LiDAR, or Radar.

16. A method of using an intelligent multi-visual camera system for assisting robotics by sensing, detecting, and communicating information about objects in an environment, the method comprising:
providing a multiple visual sensor array including multiple visual cameras spaced apart from each other, wherein each of the multiple visual cameras is mounted on a support frame, and wherein each camera acquires its own independent image;
initiating a registration system that projects images from the multiple visual cameras into a single three-dimensional volume;
detecting one or more features of interest in the images from the multiple visual cameras, wherein detection of features of interest includes classification, pixel location in the image, and boundary representation in the image;
tracking one or more features of interest in one frame in an image from the multiple visual cameras, and identifying the same feature of interest in a subsequent frame in an image from the multiple visual cameras;
projecting the features of interest from the multiple visual cameras into the three-dimensional volume to identify instances where the same objects have been identified by multiple cameras and ensure unique features of interest;
limiting the three-dimensional volume around a ground plane, wherein a search volume is a truncated curved cone shaped volume that covers the three-dimensional volume represented by a rectangular box;
reducing a size of the search volume by rotating the search volume, transforming a position of the search volume from oblique to orthographic, and further truncating the curved cone shaped volume; and
predicting, through the search volume, a presence of an object in the absence of object detection by logging positions of objects over time;
communicating information regarding the one or more features of interest that have been detected.

17. The method of claim 16, wherein communicating information regarding the features of interest that have been detected comprises displaying collected imagery as a single synthesized view of camera feed overlap from the multiple visual cameras with overlaying boxes on the displayed collected imagery identifying objects of interest.

18. The method of claim 16, wherein communicating information regarding the features of interest that have been detected comprises sending instructions based on the projected images from the multiple visual cameras to one or more of actuator controls and operational control software.

19. The method of claim 16, wherein a number, type, and position of the multi-visual cameras are configurable, enabling sensing over differently sized regions, at various resolution requirements.

20. The method of claim 16, wherein projecting the features of interest from the multiple visual cameras into the three-dimensional volume further comprises:
detecting shared common points in one frame from each camera with data associated with shared common point locations within the three-dimensional volume.

21. The method of claim 20, wherein projecting the features of interest from the multiple visual cameras into the three-dimensional volume further comprises:
using the shared common point locations to characterize a geometry that transforms the images to an epipolar representation.

22. The method of claim 21, wherein projecting the features of interest from the multiple visual cameras into the three-dimensional volume further comprises:
calculating row-dependent shifts parallel to epipolar lines.

23. The method of claim 22, wherein projecting the features of interest from the multiple visual cameras into the three-dimensional volume further comprises:
providing mapping features in one image from the multiple visual cameras to equivalent features in other images from other cameras of the multiple visual cameras that overlap the same search volume.

24. The method of claim 16, wherein projecting the features of interest from the multiple visual cameras into the three-dimensional volume further comprises:
increasing computational speed and accuracy of a stereo disparity calculation by limiting feature search volume.

25. The method of claim 16, wherein the detecting features of interest in the images from the multiple visual cameras is performed using a neural network, and wherein the neural network is configurable for use in any environment, with any number of desired object classes.

26. The method of claim 16, wherein computational speed improvement is achieved by the method since tracking operations are less computationally demanding than detection operations, whereby a detection operation is intermittently replaced with a tracking operation, following the location of a previously detected feature rather than redundantly detecting the feature location out of a full environment on each iteration.

27. The method of claim 16, wherein a tracking operation simultaneously enables confirmation of distinguishing two features in sequential images or associating two features in sequential images.

28. The method of claim 16, wherein projecting the features of interest from the multiple visual cameras into the three-dimensional volume to identify instances where the same objects have been identified by multiple cameras and ensure unique features of interest further comprises:
determining sets of identified objects from each image which have been highlighted in the detecting and the tracking of those images, and producing a single set of all objects identified in a total sensed search volume by removing duplicate objects in the three-dimensional volume.

29. The method of claim 16, wherein predictive ego-tracking provides an estimation of platform motion through the three-dimensional volume and can provide an estimated time to reach a location within the three-dimensional volume.

30. The method of claim 16, wherein the logging system uses artificial intelligence to provide continuous performance improvement.

31. The method of claim 16, wherein the intelligent multi-visual camera system further comprises one or more of visual, infra-red, multi spectral imaging, LiDAR, or Radar.

32. An intelligent multi-camera system, the system comprising:
a multiple sensor array including multiple cameras spaced apart from each other, wherein each of the multiple cameras is mounted on a support frame, and wherein each camera acquires its own independent image; and
a control system that receives input from the multiple cameras, the control system including a processor and a memory storing computer instructions that, when executed by the processor, cause the processor to:
initiate a registration system that projects images from the multiple cameras into a single three-dimensional volume;
detect one or more features of interest in the images from the multiple cameras, wherein detection of features of interest includes classification, pixel location in the image, and boundary representation in the image;
track one or more features of interest in one frame in an image from the multiple cameras, and identify the same one or more features of interest in a subsequent frame in an image from the multiple cameras;
project the features of interest from the multiple cameras into the three-dimensional volume to identify instances where the same objects have been identified by multiple cameras and ensure unique features of interest;
limiting the three-dimensional volume around a ground plane, wherein a search volume is a truncated curved cone shaped volume that covers the three-dimensional volume represented by a rectangular box;
reducing a size of the search volume by rotating the search volume, transforming a position of the search volume from oblique to orthographic, and further truncating the curved cone shaped volume; and
predicting, through the search volume, a presence of an object in the absence of object detection by logging positions of objects over time;
communicate information regarding the features of interest that have been detected.

33. The system of claim 32, wherein communicating information regarding the features of interest that have been detected comprises displaying collected imagery as a single synthesized view of camera feed overlap from the multiple cameras with overlaying boxes on the displayed collected imagery identifying objects of interest.

34. The system of claim 32, wherein the control system contains further computer instructions that, when executed by the processor, cause the processor to send instructions based on the projected images from the multiple cameras to one or more of actuator controls and operational control software.

35. The system of claim 32, wherein a number, type, and position of the multiple cameras are configurable, enabling sensing over differently sized regions, at various resolution requirements.

36. The system of claim 32, wherein the control system contains further computer instructions that, when executed by the processor, cause the processor to:
detect shared common points in one frame from each camera with data associated with shared common point locations within the three-dimensional volume.

37. The system of claim 36, wherein the control system contains further computer instructions that, when executed by the processor, cause the processor to:
use the shared common point locations to characterize a geometry that transforms the images to an epipolar representation.

38. The system of claim 37, wherein the control system contains further computer instructions that, when executed by the processor, cause the processor to:
calculate row-dependent shifts parallel to epipolar lines; and
increase computational speed and accuracy of a stereo disparity calculation due to the limiting of the three dimension search volume.

39. The system of claim 32, wherein the control system contains further computer instructions that, when executed by the processor, cause the processor to:
detect points in common between a latest set of images from the multiple cameras and a previous and overlapping set of images from the multiple cameras.

40. The system of claim 32, wherein the control system contains further computer instructions that, when executed by the processor, cause the processor to:
project a common sets of points into a reference three-dimensional volume to create corresponding sets of three-dimensional points.

41. The system of claim 40, wherein the control system contains further computer instructions that, when executed by the processor, cause the processor to:
calculate a rigid body transformation using the corresponding sets of three-dimensional points; and
estimate an ego motion of a sensing platform between a time at which a previous set of images was acquired and a latest time at which a set of images was acquired.

42. The system of claim 32, wherein detecting features of interest in the images from the multiple cameras is performed using a neural network, and wherein the neural network is configurable for use in any environment, with any number of desired object classes.

43. The system of claim 32, wherein computational speed improvement is achieved by the system since tracking operations are less computationally demanding than detection operations, whereby a detection operation is intermittently replaced with a tracking operation, following the location of a previously detected feature rather than redundantly detecting a feature location out of a full environment on each iteration.

44. The system of claim 32, wherein a tracking operation simultaneously enables confirmation of distinguishing two features in sequential images or associating two features in sequential images.

45. The system of claim 32, wherein the control system contains further computer instructions that, when executed by the processor, cause the processor to:
determine sets of identified objects from each image which have been highlighted in the detecting and the tracking of those images, and produce a single set of all objects identified in a total sensed search volume by removing duplicate objects in the three-dimensional volume.

46. The system of claim 32, wherein the system includes predictive ego-tracking, and wherein the predictive ego-tracking provides an estimation of platform motion through the three-dimensional volume and can provide an estimated time to reach a location within the three-dimensional volume.

47. The system of claim 32, wherein a logging system uses artificial intelligence to provide continuous performance improvement.

48. The system of claim 32, wherein the intelligent multi-camera system further comprises one or more of visual, infra-red, multispectral imaging, LiDAR, or Radar.

* * * * *